May 4, 1943. J. C. CROWLEY 2,318,377
STEM CONNECTION FOR CURING MOLDS
Filed April 4, 1941 2 Sheets-Sheet 1

INVENTOR.
JOHN C. CROWLEY
BY Kwis Hudson & Kent
ATTORNEYS

May 4, 1943. J. C. CROWLEY 2,318,377
STEM CONNECTION FOR CURING MOLDS
Filed April 4, 1941 2 Sheets-Sheet 2

INVENTOR.
JOHN C. CROWLEY
BY Kwis Hudson & Kent
ATTORNEYS

Patented May 4, 1943

2,318,377

UNITED STATES PATENT OFFICE 2,318,377

STEM CONNECTION FOR CURING MOLDS

John C. Crowley, Cleveland Heights, Ohio, assignor to The Dill Manufacturing Company, Cleveland, Ohio, a corporation of Ohio Application April 4, 1941, Serial No. 386,915

15 Claims. (Cl. 18—38)

This invention relates to a mold for curing inflatable rubber articles such as pneumatic tire tubes or other similar articles.

More particularly the invention relates to the provision in a mold of the character specified of means for connecting the valve stem of the inflatable rubber article to be cured to a source of pressure fluid and for properly positioning said valve stem in the stem cavity of the mold and, if the valve stem is a rubber valve stem, preferably of imparting to said stem its final shape and effecting the proper and complete curing of the same during the curing of the article.

A device embodying the present invention may be used to special advantage in a mold for curing tire tubes or other inflatable rubber articles and which articles are equipped with rubber valve stems. These rubber valve stems may be molded and partially cured before they are applied to the articles and placed with the latter in the curing mold. In such instance the curing of the rubber valve stems is completed during the curing of the articles.

On the other hand, the rubber valve stems when initially applied to the articles and placed with the latter in the curing mold may consist of pieces or chunks of uncured or raw rubber stock only preformed into valve stem shape to an extent sufficient to enable the pieces or chunks of raw rubber stock to enter the stem cavity of the mold and be cured and molded thereby into final valve stem shape simultaneously with the curing of the articles; the valve stems and articles when cured becoming integrated units.

The method of manufacturing rubber valve stems and tire tubes as integrated units in the manner just referred to is disclosed in Bronson Patent No. 2,230,879, issued February 4, 1941, and a device embodying the present invention can be used advantageously in a curing mold to facilitate carrying out the method disclosed in said patent.

An object of the invention is to provide in a curing mold for curing inner tubes and other inflatable rubber articles, improved and novel means forming the valve stem cavity of the mold and including instrumentalities for connecting the valve stems of the articles being cured to a source of pressure fluid and for facilitating the complete and proper positioning of the valve stems in said mold cavity.

Another object is to provide in a curing mold for curing tire tubes and other inflatable rubber articles which are equipped with rubber valve stems, improved and novel means for connecting the rubber valve stems to a source of pressure fluid, for imparting the required and desired final shape to the rubber valve stems and for properly and completely curing said rubber valve stems simultaneously with the curing of the tire tubes or other inflatable articles.

A further object is to provide in a mold for simultaneously molding and curing as integrated units uncured tire tubes or other inflatable rubber articles and raw or uncured rubber valve stems therefor, improved and novel means for connecting the valve stems to a source of pressure fluid and for molding the stems into valve stem shape and for properly curing the uncured stems and uncured articles simultaneously to the desired amount.

A further object is to provide improved and novel means such as above specified and which means is efficient in operation and is relatively simple in construction and facilitates the positioning of the articles to be cured in the curing mold, as well as the connecting of the valve stems to a source of pressure fluid.

Another object is to provide in a curing mold for inner tubes or other inflatable articles a removable valve stem curing cavity block comprising improved and novel means for simultaneously positioning the valve stem in the cavity and connecting the same to a source of fluid under pressure for producing internal pressure in the article whereby pressure is applied at the valve stem cavity, thereby assisting in imparting final shape to the rubber valve stem.

Another object is to provide in a curing mold for inner tubes and other inflatable articles a removable valve stem curing cavity block assembly comprising improved and novel means for heating the cavity independently of the heating means for the mold and for simultaneously locating the valve stem in the cavity and connecting the same to a source of fluid under pressure whereby pressure and heat are applied to the uncured valve stem to assist in the final shaping and curing thereof and the vulcanization of the rubber of the stem to the metal insert.

Further and additional objects and advantages not hereinbefore specified will become apparent hereinafter during the detailed description of an embodiment of the invention which is illustrated in the accompanying drawings wherein Fig. 1 is a fragmentary view, partly in section and partly in elevation, and includes a sectional view of a portion of a curing mold to which the connecting device embodying the invention is secured and which device is shown partly in section and partly in elevation, an uncured tire tube and an uncured rubber valve stem therefor being shown in the mold with the metal insert of the stem connected to the connecting device but the stem not drawn into final position in the stem cavity of the device;

Fig. 3 is a transverse sectional view through the connecting device and is taken substantially on line 3—3 of Fig. 2, looking in the direction of the arrows; and Fig. 4 is an irregular transverse sectional view through the connecting device and is taken substantially on line 4—4 of Fig. 2 looking in the direction of the arrows.

Figure 1:
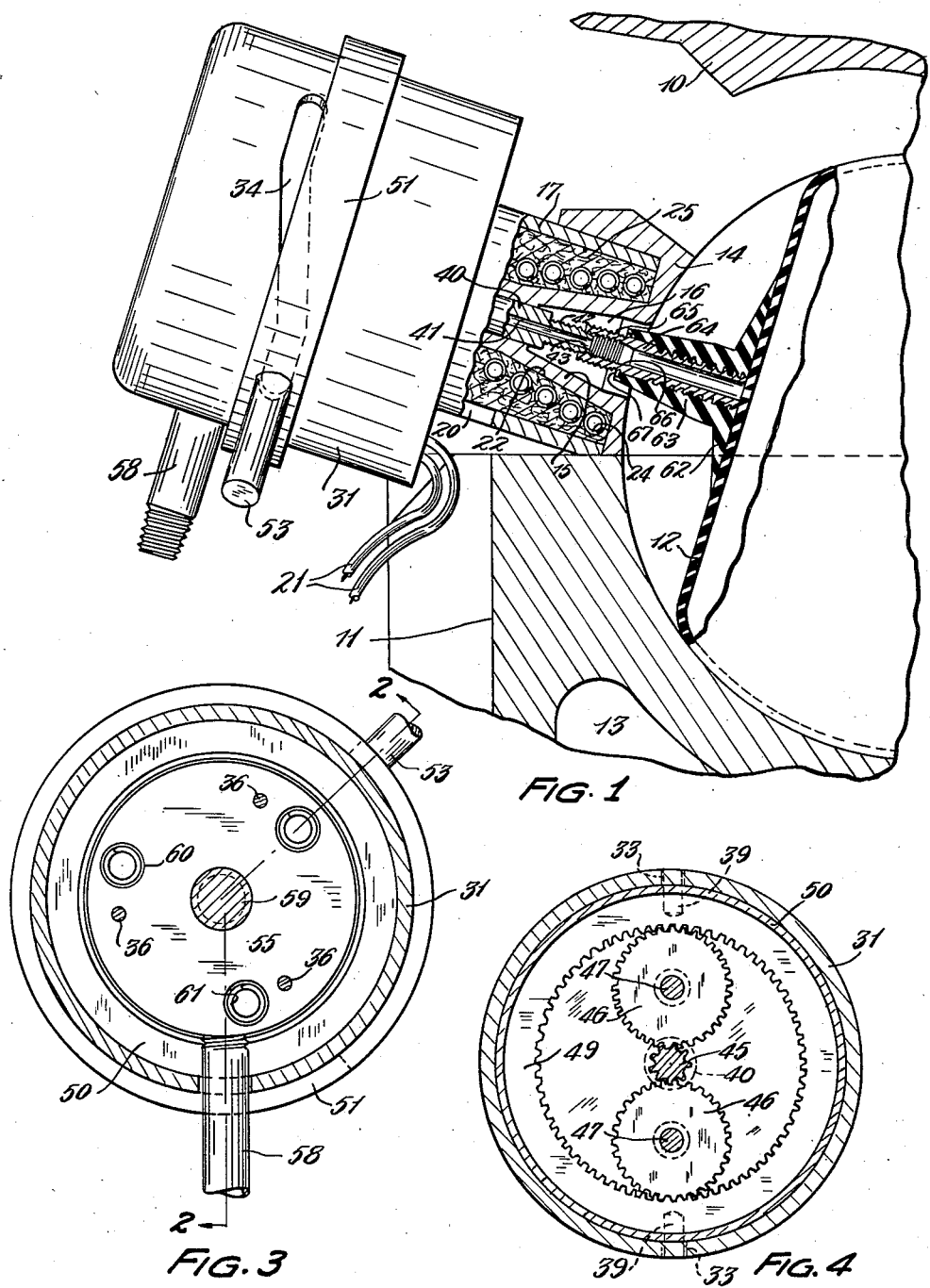
Figure 2:
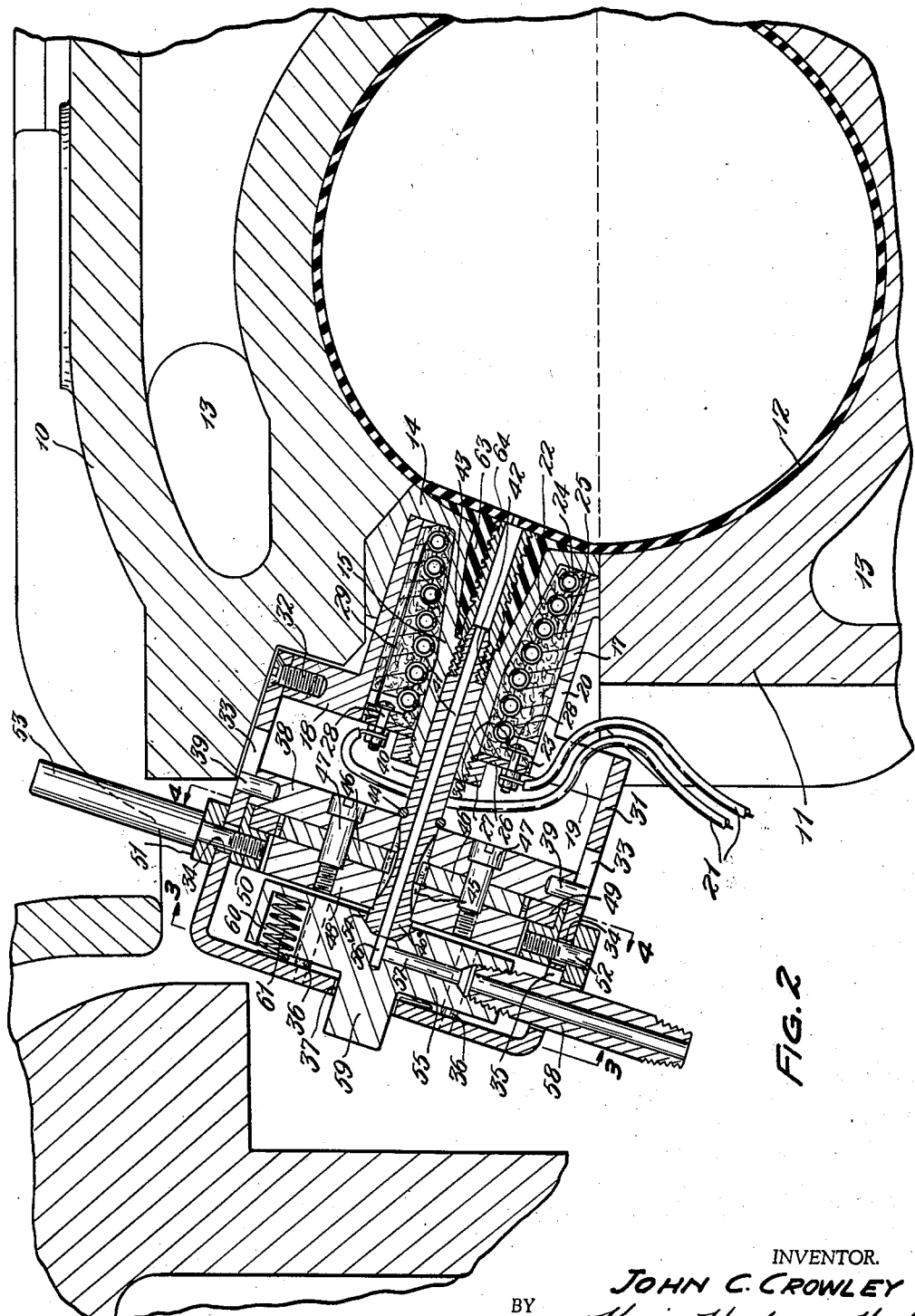
Fig. 2 is a view similar to Fig. 1 except that the connecting device is shown in full longitudinal section and with the rubber valve stem drawn into final position in the stem cavity of the device, the sectional showing of the connecting device in Fig. 2 being taken substantially on irregular line 2—2 of Fig. 3 looking in the direction of the arrows.

The curing mold has only been shown fragmentarily in Figs. 1 and 2 since the construction of the curing mold per se forms no part of the present invention and is well known and understood in the art. It should suffice herein to point out that preferably the curing mold is of the watchcase type of mold and comprises the two relatively movable mold members 10 and 11, each of which is provided with an annular mold cavity of semi-circular cross section.

The mold member 11 preferably is fixed while the mold member 10 is pivotally supported so as to allow it to be swung away from the mold member 11, as indicated in Fig. 1, or to be moved into closed position against the upper surface of the mold member 11, as indicated in Fig. 2.

When the mold members are in open position, an inflatable article to be cured can be positioned in the mold cavity of the member 11 as, for example, the uncured tire tube 12 shown in the drawings. When the inflatable article has been thus positioned the mold member 10 is moved into closed position and the inflatable article inflated to fill the circular and annular mold cavity formed by the cooperating semi-circular cross sectional mold cavities of the two members.

Suitable pressure fluid is employed for inflating the inflatable article in the mold cavity. It is usual in curing molds of this type to supply the heat of vulcanization by circulating steam through passages 13 cored out of the mold members 10 and 11 and located in relatively close proximity to the mold cavities therein.

In the curing of tire tubes it is usual to inflate the tubes in the curing mold by pressure fluid forced into the tubes through the valve stems thereof. These valve stems for the inner tubes at the present time are quite generally of the so-called rubber valve stem type. These rubber valve stems generally comprise a base portion which is secured to the outer surface of the tube and a stem portion extending outwardly from the base portion and ordinarily provided with a metal insert for receiving a valve insides or valve mechanism. These rubber valve stems are well known in the art and need not be described in greater detail herein.

It has been customary in manufacturing the rubber valve stems to mold the same and at least partially cure the valve stems before the latter are mounted on the inner tubes. It has been proposed also to finally mold and completely cure the rubber valve stems from uncured rubber stock simultaneously with the curing of the inner tubes in the curing mold. This latter method is fully disclosed in the aforementioned Bronson Patent No. 2,230,879.

Inasmuch as the connecting device embodying the present invention has particular utility when used in a curing mold for carrying out the method disclosed in said Bronson patent it will be described herein in connection with such use, but it will be understood that said device may also be advantageously employed in molds for curing tire tubes equipped with rubber valve stems manufactured in a different manner from that disclosed in the Bronson patent such, for example, as the usual way in which rubber valve stems are manufactured.

The connecting device is of such construction that it can readily be employed in the conventional curing mold without the necessity of materially changing the mold construction other than adjacent that portion of the mold containing the usual valve stem cavity.

The device embodying the present invention is fixedly but detachably associated with the lower mold member 11 and is arranged thereon at the position occupied by the usual valve stem cavity of the curing mold. In fact the device embodies therein a valve stem cavity that supplants the customary valve stem cavity of the curing mold and functions for the same purpose.

The lower and stationary mold member 11 is provided with an opening therein where the usual valve stem cavity is located and the device of the present invention is fixedly but removably mounted in said opening. This device comprises a member forming the valve stem cavity and which includes a base or attaching portion 14 fixedly secured to the mold member 11 in the opening therein with its inner surface forming a continuation of the surface of the semi-cylindrical mold cavity of the mold member 11. The valve stem cavity member also includes a tubular portion 15 extending outwardly of the opening from the base portion 14 and provided with a bore therethrough part of which is cylindrical in shape while the remainder of the bore is shaped correspondingly to the exterior configuration of the rubber valve stem as indicated at 16 in Fig. 1.

A cylindrical member 17 surrounds the portion 15 of the valve stem cavity member in spaced relationship with said portion and is secured by suitable means to the outwardly extending flanges which are integral with the base portion 14 of the valve stem cavity member, as clearly shown in Figs. 1 and 2.

The cylindrical member 17 at its outer end is provided with a radially extending annular attaching flange 18. This flange 18 and the cylindrical member 17 are provided with connecting slots 19 and 20, see Fig. 2, to accommodate electric leads 21. Telescoped upon the portion 15 of the valve stem cavity member is a sleeve 22 for supporting an electrical resistance or heating element later to be referred to. This sleeve 22 may be formed of any suitable material, such as a vitreous material, and is provided at its outer end with a radially extending annular flange 23. An electric resistance or heating element 24 is coiled around the sleeve 22 and is supported by said sleeve and a second sleeve 25 preferably formed of vitreous material and interposed between the resistance element and the cylindrical member 17.

A plate 26 provided with a central opening is positioned over the outer end of the portion 15 of the valve stem cavity member and bears against the flange 23 of the sleeve 22, said plate being held in assembled and clamping position by means of a clamping nut 27 screwed on the threaded outer end of the portion 15 of the valve stem cavity member, as clearly illustrated in Fig. 2. The plate 26 and flange 23 carry binding posts 28 one of which is connected by the lead 29 to one end of the electrical resistance or heating element 24, while the other binding post is connected by a short lead 30 to the opposite end of said element. The electrical conduits 21 are electrically connected to the binding posts 28, as will be well understood, and extend to a source of electrical energy, wherefore through well known control means the heating element 24 can be energized at will.

The purpose of the heating element 24 is to provide vulcanizing heat closely adjacent to the valve stem cavity and independently of the vulcanizing heat produced by the stem circulating in the cored passages 13 of the mold, to the end that the rubber stock of the relatively thick valve stem may be completely cured in the same period of time required for curing the relatively thin tire tube or other inflatable rubber article.

Of course, in place of the electrical heating element other means might be used for providing the heat of vulcanization for the valve stem as, for instance, steam could be circulated in close proximity to the valve stem cavity.

From the foregoing description it will be understood that the elements of the device already described are rigidly but removably secured to the fixed lower mold member 11 and in effect constitute a structural part thereof.

An inverted cup-shaped casing 31 is positioned with its open end surrounding the attaching flange 18 of the cylinder 17 and is rigidly secured to said flange by means of circumferentially spaced securing screws 32, only one of which is illustrated in the drawings. The cup-shaped casing 31 is provided in its side wall with a pair of longitudinally extending diametrically opposed slots 33, as clearly indicated in Fig. 2, the purpose of which later will be pointed out. The side wall of the cup-shaped casing 31 is also provided with a pair of cam slots 34 extending circumferentially of the casing and arranged in reverse relationship with respect to each other and on diametrically opposite sides of the casing. The cam slots 34 are provided at each end with straight portions between which are inclined portions. The purpose of the cam slots 34 will later become more apparent. The side wall of the casing 31 is also provided with a longitudinally extending slot 35, while the bottom or end wall of the casing supports a plurality of circularly spaced guide pins 36 which project inwardly of the casing, see Figs. 2 and 3. In addition the bottom or end wall of the casing 31 is provided with a central opening 37.

A disk 38 is slidably supported in the casing 31 and carries at diametrically opposite points fixed pins 39 extending from the circumference of the disk into the longitudinal slots 33 in the side wall of the casing and said pins serve to guide the disk 38 in its sliding movement and prevent rotation of the same.

The disk 38 is provided with a central opening through which rotatably extends the stem connecting member 40. The stem connecting member 40 has a longitudinal passage 41 therethrough and preferably is substantially cylindrical in shape for the major portion of its length and slidably and rotatably fits in the cylindrical part of the bore through the portion 15 of the valve stem cavity member. The connecting member 40 has a reduced inner end, a portion of which is exteriorly threaded, as indicated at 42, while the extreme tip of said reduced end is tapered as indicated at 43. The inner end of the connecting member 40 is of such size and shape that it can be screwed into the bore through the valve stem and will cooperate with the wall of the bore so as to form a fluid-tight seal therewith, as will later be brought out more in detail.

The disk 38 and the connecting member 40 although having relative rotation may move together in an axial direction. The disk 38 is held against relative axial movement with respect to the connecting member 40 in one direction, i. e., toward the inner end of said member by suitable abutting means as, for example, the spring wire 44 surrounding the member 40 and located in a groove formed in said member and abutting the inner side of the disk 38.

The member 40 adjacent the disk 38 is provided with gear teeth 45 which mesh with gears 46 rotatably mounted on stub shafts 47 carried by the disk 38 and screwed into a plate 48 through which the member 40 rotatably extends. The gears 46 mesh with an internal ring gear 49 that is fixedly connected by suitable means, such as screws not shown, to a supporting ring 50 rotatably and slidably mounted within the casing 31 in a position between the cam slots 34. An actuating band 51 rotatably and slidably fits the outer circumference of the casing 31 and said band is operatively connected to the ring 50 by means of a headless screw 52 extending through an opening in the band 51 and through one of the cam slots 34 and screwed into the ring 50.

Diametrically opposite to the screw 52 a handle 53 is connected to the band 51 by means of a reduced portion extending through the band and through the other cam slot 34 and having its end screwed into the ring 50. It will be seen that when the handle 53 is moved from the position shown in Fig. 1 to the position shown in Fig. 2 the band and the ring 50 not only are rocked but also are moved endwise within the casing 31 due to the straight and inclined portions of the cam slots 34 and the screw 52 and the reduced end of the handle 53 passing through said slots. The rocking movement of the handle not only rocks the band 51 but also the ring 50 and the internal ring gear 49, with the result that the gears 46 are rotated, which, in turn, rotate the stem connecting member 40. The movement of the band 50 and ring gear 49 lengthwise of the casing during the rocking of the handle 53 through the inclined portion of the cam slot causes the disk 38, connecting member 40, gears 46 and plate 48 also to move together in a direction endwise of the casing, since these parts are all interconnected and the ring gear 49 is interposed between the disk 38 and plate 48.

It will be recalled that the disk 38 and plate 48 do not rotate but are mounted on the connecting member 40 so the latter can rotate relative to the disk and plate but cannot move endwise with respect thereto. Of course movement of the handle 53 from the position shown in Fig. 2 to the position shown in Fig. 1 acts in a similar manner to rotate the connecting member 40 in the reverse direction and also to move said member endwise in the reverse direction.

The connecting member 40 outwardly of the plate 48 is provided with a conical head 40a which fits into a conical recess 54 of a circular block member 55. This member 55 is provided with a short bore 56 terminating centrally of the conical recess 54 and aligning with the bore 41 through the connecting member 40. Extending substantially at right angles to the bore 56 a second and radially disposed bore 57 is formed in the block member 55 and has its outer end enlarged and shaped and threaded to receive one end of a coupling fitting 58 which projects through the slot 35 in the side wall of the casing 31. A suitable conduit, not shown, can be connected to the outer end of the coupling fitting 58 and such conduit extends from a suitable source of supply of pressure fluid.

The block member 55 on its side opposite to the recess 54 is provided with a projection 59 that extends through the opening 37 in the bottom wall of the casing 31. The guide pins 36 supported by the bottom wall of the casing 31 project into openings or recesses formed in the block 55 and act to properly position the same and guide the block in its movements. The block 55 is provided with a plurality of recesses 60 extending inwardly of the block from the outer side thereof and said recesses house coil springs 61 which have one of their ends abutting the bottom of the recesses and the opposite ends abutting the bottom of the cup-shaped casing. These coil springs 61 always maintain the wall of the recess 54 in tight engagement with the end 40a of the connecting member 40 as said member rotates and moves endwise in the casing, it being noted that sufficient clearance is provided between the block 55 and the bottom or end wall of the casing 31 to allow the block to have the required amplitude of movement.

In order to make the description of the construction of the device, together with the manner in which it functions, perfectly clear and to bring out the advantages derived from the employment of the device, its operation will now be explained in relation to the curing of a tire tube and rubber valve stem in the mold. Inasmuch as the device has particular utility when used in a mold in conjunction with practicing the method disclosed in said Bronson Patent No. 2,230,879, the following description of the mode of operation of the device is set forth from this aspect, but it will be understood that the device could also be used advantageously in a mold for practicing other processes of manufacturing and curing tire tubes and rubber valve stems therefor.

The tire tube indicated at 12 is formed of uncured rubber stock and placed in the curing mold in the usual way when the mold members 10 and 11 are in open or tube receiving position. The valve stem shown herein, by way of illustration only, comprises in its finished form a rubber base portion 62 arranged on the outer surface of the tube 12 and ultimately integrated therewith and a rubber stem portion 63. A metal insert 64 is arranged in the rubber valve stem, as will be well understood, and in this particular instance is provided with a bore shaped and formed to receive and maintain in assembled position the usual valve insides or core and includes a threaded portion 65 and a tapered shoulder portion 66. The metal insert 64 also preferably is provided with an external flange 67 which, in the finished valve stem, is located at the outer end of the rubber stem portion 63.

In accordance with the method disclosed in said Bronson Patent No. 2,230,879 the rubber valve stem may first be attached to the tube 12 and positioned in the curing mold at the same time that the tube is positioned therein, or the stem and tube may be separately positioned in the mold and then the base portion 62 of the stem may be adhered to the outer surface of the tube.

The rubber valve stem when placed in the curing mold is of uncured or raw rubber stock in which the metal insert is embedded. This uncured or raw rubber stock may be simply in the form of a piece or chunk of raw or uncured rubber only shaped enough to allow it to enter the stem cavity 16 and be shaped thereby. On the other hand it may be preformed cold from raw or uncured rubber stock having substantially valve stem shape, and it is this latter instance that is illustrated herein.

Assuming that the preformed uncured or raw valve stem has been positioned on the tube 12 and the latter placed in the mold, the operator inserts the tapered tip 43 of the reduced end of the connecting member 40 into the outer end of the bore of the metal insert 64 and rocks the handle slightly in the straight portion of the cam slot 34 to cause an engagement between the threads 42 on the reduced end of the connecting member and the threads 65 in the metal insert. The parts and the valve stem and tube are then in the position shown in Fig. 1. The operator then further rocks the handle 53 in the initial straight portion of the cam slot, then in the inclined portion thereof, and finally in the second straight portion until it is in the position shown in Fig. 2. This further rocking movement of the handle 53 effects, as has been previously described, a rotating movement of the connecting member 40 and also an endwise movement thereof, with the result that the reduced end of the connecting member 40 first is screwed further into the metal insert, then said connecting member is moved endwise or axially from the position shown in Fig. 1 substantially to the position shown in Fig. 2, with the result that the valve stem is drawn into the stem cavity 16 until the flange 67 substantially abuts the shoulder at the outer end of the stem cavity while the outer end of the metal insert is in air sealing contact with the reduced end of the connecting member 40. The final rocking of the handle in the second straight portion of the cam slot screws the tapered tip of the connecting member into tight contact with the tapered shoulder portion 66 in the bore of the insert.

The curing mold is now closed and pressure fluid is admitted through the bores 57, 56, and 41 and the valve stem into the tube 12 to inflate the latter so that it will completely fill the mold cavity and assist in firmly pressing the valve stem into final position in the stem cavity. The curing mold is heated to vulcanizing temperature, as will be well understood.

Since the electrical heating element surrounds the valve stem cavity and a portion of the connecting member 40, its energization will apply heat to both the stem cavity and the metal insert of the valve stem to effect the cure and final molding of the valve stem and its vulcanization to the metal insert.

It will be appreciated that the rubber of the valve stem which is to be vulcanized to the metal insert, being thicker stock than the stock forming the tube, might require a longer time to be properly vulcanized than would be necessary for the tube unless additional heat is supplied for this purpose to the valve stem cavity and the metal insert.

The vulcanization of the tube and valve stem under heat and pressure, as just described, molds these elements and particularly the valve stem into their final shape and integrates the base of the valve stem with the material of the tube and vulcanizes the metal insert 64 in the rubber valve stem.

After the tube and valve stem have been subjected to the curing heat and pressure for the proper time the supply of pressure fluid is disconnected and the pressure in the tube may be reduced, after which the mold is opened, and then the operator rocks the handle 53 from the position shown in Fig. 2 to substantially the position shown in Fig. 1. This rocking movement of the handle rotates the connecting member 40 in the reverse direction and unscrews the same from the metal insert while the inward endwise movement imparted to the connecting member at this time pushes the valve stem out of the mold cavity, wherefore the operator can quickly remove the metal insert of the valve stem from the reduced end of the connecting member 40 and remove the cured tube and cured rubber valve stem integrated therewith from the mold.

From the foregoing it will have been observed that the vulcanizing of the tube and rubber valve stem is greatly facilitated by the use of a mold employing in combination therewith a device embodying the present invention. Also the use of this device assures the proper positioning of the rubber valve stem in the mold cavity inasmuch as the stem is mechanically drawn into the cavity in addition to its being forced into the same by the pressure of the inflated tube.

Although a preferred embodiment of the invention has been illustrated and described herein, it will be understood that the invention is susceptible of various modifications and adaptations within the scope of the appended claims.

Having thus described my invention, I claim:

1. In combination with a curing mold for inner tubes or other inflatable rubber articles provided with valve stems having threaded portions, means for connecting the stems to a source of pressure fluid and for positioning said stems in the mold and including a member having a threaded portion adapted when said member is rotated to engage said threaded portions of said valve stems, and means for moving said member bodily endwise to draw said stems into position in the mold.

2. In combination with a curing mold for inner tubes or other inflatable rubber articles provided with valve stems having threaded portions, means for connecting the valve stems to a source of pressure fluid and for positioning said stems in the mold, said means including a connecting member having a bore therethrough, one end of said member being adapted to be connected with a source of supply of pressure fluid, the opposite end of said member being threaded, and mechanism for rotating said member to cause said threaded end thereof to engage said threaded portions of the valve stems, said mechanism including elements for effecting endwise movement of said member to draw the valve stems into position in the mold.

3. In combination with a curing mold for inner tubes or other inflatable rubber articles, a device for connecting the rubber valve stems of the articles to a source of pressure fluid to enable the articles to be inflated in the mold and which device is capable also of curing and/or molding the rubber stems, said device comprising elements fixedly secured to a portion of said mold and provided with a valve stem cavity therein in communication with the main mold cavity, a member operatively associated with said elements and movable to connect the valve stems to a source of pressure fluid and to draw the stems into the stem cavity, and actuating means operatively associated with said elements and said member for effecting the requisite movements of said member.

4. In combination with a curing mold for inner tubes or other inflatable rubber articles, a device for connecting the rubber valve stems of the articles to a source of pressure fluid to enable the articles to be inflated in the mold and which device is capable also of curing and/or molding the rubber stems, said device comprising elements fixedly secured to a portion of said mold and provided with a valve stem cavity therein in communication with the main mold cavity and having a portion forming a part of said main cavity, means associated with said elements for providing vulcanizing heat in close proximity to said stem cavity, a member operatively associated with said elements and movable to connect the valve stems to a source of pressure fluid and to draw the stems into the stem cavity, and actuating means operatively associated with said elements and said member for effecting the requisite movements of said member.

5. In combination with a curing mold for inner tubes or other inflatable rubber articles provided with rubber valve stems having threaded portions, a device for connecting the stems to a source of pressure fluid to enable the articles to be inflated in the mold, said device comprising elements fixedly secured to a portion of said mold and provided with a valve stem cavity therein in communication with the main mold cavity, a member rotatably and slidably supported by said elements and having a threaded end extending into said stem cavity, and means operatively associated with said elements and said member for rotating the latter to cause the threaded end thereof to engage the threads of the valve stems and for moving said member axially to draw the stems into the stem cavity.

6. In combination with a curing mold for inner tubes or other inflatable rubber articles provided with rubber valve stems having threaded portions, a device for connecting the stems to a source of pressure fluid to enable the articles to be inflated in the mold and which device is capable also of curing and/or molding the rubber valve stems, said device comprising elements fixedly secured to a portion of said mold and provided with a valve stem cavity therein in communication with the main mold cavity, means associated with said elements for producing vulcanizing heat in close proximity to said stem cavity, a member slidably and rotatably supported by said elements and having a threaded end extending into said mold cavity, and means operatively associated with said elements and said member for rotating the latter to cause the threaded end thereof to engage and disengage the threads of said valve stems and for moving the member axialy to mechanically move said valve stems into and out of said stem cavity.

7. In combination with a curing mold for inner tubes or other inflatable rubber articles provided with rubber valve stems having threaded portions, a device for connecting the stems to a source of pressure fluid to enable the articles to be inflated in the mold, said device comprising elements fixedly secured to a portion of said mold and provided with a valve stem cavity therein in communication with the main mold cavity, a member rotatably and slidably supported by said elements and having an end portion extending into said stem cavity and which portion is threaded and shaped to engage the threaded portions of said valve stems and have sealing engagement therewith, said member being provided with a passage therethrough in communication with a source of supply of pressure fluid, and means actuatable by the operator for rotating said member to cause the same to engage and disengage said valve stems and for moving said member endwise to positively move said valve stems into and out of said stem cavity, said means including driving elements for rotating said member and which are movable with said member for imparting endwise movement thereto.

8. In combination with a curing mold for inner tubes or other inflatable rubber articles provided with valve stems having threaded portions, a device for connecting the valve stems to a source of pressure fluid to enable the articles to be inflated in the mold, said device comprising elements fixedly secured to a portion of said mold and provided with a valve stem cavity therein in communication with the main mold cavity, a member slidably and rotatably supported by said elements and having an end portion extending into said stem cavity and threaded and shaped to be screwed into sealing engagement with the threaded portions of the valve stems, said member having a passage therethrough in communication with a source of pressure fluid and being provided intermediate its ends with gear teeth, gearing associated with said gear teeth for rotating said member, said gearing being carried by supporting means having bodily endwise movement with said member, and means for rotating said gearing to rotate said member and for moving said supporting means to effect endwise movement of said member.

9. In combination with a curing mold for inner tubes or other inflatable rubber articles provided with rubber valve stems having threaded portions, a device for connecting the stems to a source of pressure fluid to enable the articles to be inflated in the mold and which device is capable also of curing and/or molding the rubber stems, said device comprising elements fixedly and detachably secured to a portion of said mold and provided with a valve stem cavity therein in communication with the main mold cavity, means associated with said elements for providing vulcanizing heat in close proximity to said stem cavity, a member slidably and rotatably supported by said elements and having an end portion extending into said stem cavity and threaded and shaped to engage the threaded portions of said valve stems and have sealing engagement therewith, said member being provided with a passage therein in communication with a source of supply of pressure fluid, a casing fixedly secured to said elements, a support non-rotatably mounted in said casing but slidable therein and operatively associated with said member, said support and said member having cooperating means for rotating said member, and means carried by said casing and having rotative movement to actuate said cooperating means and for sliding movement to move said support and said member endwise, said last named means including a cam slot formed in said casing, and an operating handle extending through said slot.

10. In combination with a curing mold for inner tubes or other inflatable rubber articles, a device for connecting the rubber valve stems of the articles to a source of pressure fluid to enable the articles to be inflated in the mold and which device is capable also of curing and/or molding the rubber stems, said device comprising elements fixedly secured to a portion of said mold and provided with a valve stem cavity therein in communication with the main mold cavity, means associated with said elements for providing vulcanizing heat in close proximity to said stem cavity, a member operatively associated with said elements and extending into said valve stem cavity and movable to connect the valve stems to a source of pressure fluid and to draw the stems into the stem cavity, and actuating means operatively associated with said elements and said member for effecting the requisite movements of said member.

11. In combination with a curing mold for inner tubes or other inflatable rubber articles, a device for connecting the rubber valve stems of the articles to a source of pressure fluid to enable the articles to be inflated in the mold, said device comprising elements fixedly secured to a portion of said mold and provided with a valve stem cavity therein in communication with the main mold cavity, and an endwise movable member operatively associated with said elements and extending into said stem cavity and having a passage therein and provided with means for connecting and disconnecting the member to and from the valve stems with said passage in communication with the latter, means operatively associated with said elements and said member for connecting the latter and the passage therein with a source of pressure fluid, and actuating means operatively associated with said elements and said member for actuating the latter to connect and disconnect it to and from the valve stems and to move said member endwise to draw the stems into the stem cavity and to disengage the stems with respect to said cavity.

12. In combination with a curing mold for inner tubes or other inflatable rubber articles, a device for connecting the rubber valve stems of the articles to a source of pressure fluid to enable the articles to be inflated in the mold and which device is capable also of curing and/or molding the rubber stems, said device comprising elements fixedly secured to a portion of said mold and provided with a valve stem cavity therein in communication with the main mold cavity, an endwise movable and rotatable member operatively associated with said elements and extending into said stem cavity and having a passage therein and provided with means acting upon the rotation of said member for connecting and disconnecting the latter to and from the valve stems with said passage in communication with the stems, means operatively associated with said elements and said member for connecting the latter and the passage therein with a source of pressure fluid, and actuating means operatively associated with said elements and said member for actuating the latter to rotate the same to connect and disconnect it to and from the valve stems and to move the same endwise to draw the stems into the stem cavity or to disengage the stems with respect to said cavity.

13. A device for connecting to a source of pressure fluid the rubber valve stems of inner tubes or other inflatable rubber articles mounted in a curing mold to thus enable the articles to be inflated in the mold and comprising elements adapted to be fixedly secured to a portion of said mold and provided with a valve stem cavity therein adapted when said elements are so secured to the mold to be in communication with the main mold cavity, a member operatively associated with said elements and extending into said stem cavity and movable to connect the valve stems to a source of pressure fluid and to draw the stems into said stem cavity, and actuating means operatively associated with said elements and said member for effecting the requisite movements of said member.

14. A device for connecting to a source of pressure fluid the valve stems of inner tubes or other inflatable rubber articles which are mounted in a curing mold to thus enable said articles to be inflated in the mold and comprising elements adapted to be fixedly secured to a portion of the mold and provided with a valve stem cavity therein adapted when said elements are so secured to the mold to be in communication with the main mold cavity, an endwise movable member operatively associated with said elements and extending into said stem cavity and having a passage therein and provided with means for connecting and disconnecting the member to and from the valve stems with said passage in communication with the latter, means operatively associated with said elements and said member for connecting said member and the passage therein with a source of pressure fluid, and actuating means operatively associated with said elements and said member for actuating the latter to connect and disconnect it to and from the valve stems and to move said member endwise to draw the stems into the stem cavity and to disengage the stems with respect to said cavity.

15. A device for connecting to a source of pressure fluid the valve stems of inner tubes or other inflatable rubber articles mounted in a curing mold to thus enable the articles to be inflated in the mold and comprising elements adapted to be fixedly secured to a portion of said mold and provided with a valve stem cavity therein which when said elements are so secured to the mold is adapted to be in communication with the main mold cavity, an endwise movable and rotatable member operatively associated with said elements and extending into said stem cavity and having a passage therein and provided with means for connecting and disconnecting the member when rotated to the valve stems with said passage in communication with the latter, means operatively associated with said elements and said member for connecting the latter and the passage therein with a source of pressure fluid, and actuating means operatively associated with said elements and said member for actuating the latter to rotate the same to connect and disconnect it to and from the valve stems and to move said member endwise to draw the stems into the stem cavity or to disengage the stems with respect to said cavity.

JOHN C. CROWLEY.